United States Patent
Yan et al.

(10) Patent No.: US 11,423,096 B2
(45) Date of Patent: Aug. 23, 2022

(54) METHOD AND APPARATUS FOR OUTPUTTING INFORMATION

(71) Applicant: Baidu Online Network Technology (Beijing) Co., Ltd., Beijing (CN)

(72) Inventors: Shengli Yan, Beijing (CN); Cunxiang Yin, Beijing (CN); Qian Yong, Beijing (CN); Ting Wei, Beijing (CN); Aikun Li, Beijing (CN); Lu Wang, Beijing (CN); Licen Liu, Beijing (CN); Weijia Wu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 943 days.

(21) Appl. No.: 16/133,412

(22) Filed: Sep. 17, 2018

(65) Prior Publication Data

US 2019/0163828 A1 May 30, 2019

(30) Foreign Application Priority Data

Nov. 28, 2017 (CN) .......................... 201711212965.7

(51) Int. Cl.
| G06F 16/30 | (2019.01) |
| G06F 16/951 | (2019.01) |
| G06F 16/35 | (2019.01) |
| G06F 16/90 | (2019.01) |
| H04L 67/00 | (2022.01) |
| H04L 67/50 | (2022.01) |
| H04L 67/02 | (2022.01) |

(52) U.S. Cl.
CPC .......... *G06F 16/951* (2019.01); *G06F 16/353* (2019.01); *H04L 67/02* (2013.01); *H04L 67/22* (2013.01)

(58) Field of Classification Search
CPC ..................................................... G06F 16/353
See application file for complete search history.

(56) References Cited

U.S. PATENT DOCUMENTS 8,849,812 B1 * 9/2014 Mukherjee ............ G06F 16/958
  707/728
2006/0248053 A1 * 11/2006 Sanfilippo ............. G06F 16/355

(Continued)

FOREIGN PATENT DOCUMENTS

| CN | 102831193 A | 12/2012 |
| CN | 103778207 A | 5/2014 |

(Continued)

*Primary Examiner* — Kristopher Andersen
(74) *Attorney, Agent, or Firm* — Knobbe, Martens, Olson & Bear, LLP (57) ABSTRACT

A method and an apparatus for outputting information are provided. The method includes: acquiring an info-news data set from a target info-news website; determining a field to which each piece of info-news data in the info-news data set belongs; performing, for each field, a cluster analysis on a piece of info-news data belonging to the field in the info-news data set, to obtain a number of the piece of info-news data and a cluster center in each cluster; and using, for each cluster of each field, the cluster center in the cluster as hot info-news of the field, and using the number of the piece of the information belonging to the cluster as an info-news heat degree of the hot info-news and outputting the info-news heat degree.

13 Claims, 5 Drawing Sheets

(56) References Cited

U.S. PATENT DOCUMENTS

2018/0357302 A1* 12/2018 Qi .......................... G06F 16/35
2019/0102374 A1* 4/2019 Tiwari ................... G06Q 50/01

FOREIGN PATENT DOCUMENTS

| CN | 104239436 A | 12/2014 | |
|---|---|---|---|
| CN | 105045812 A | 11/2015 | |
| CN | 107066449 A | 8/2017 | |
| WO | WO-2005073881 A1 * | 8/2005 | ........... G06F 16/358 |

* cited by examiner

METHOD AND APPARATUS FOR OUTPUTTING INFORMATION

CROSS-REFERENCE TO RELATED APPLICATIONS

This application claims priority to Chinese Patent Application No. 201711212965.7, filed on Nov. 28, 2017, titled "Method and Apparatus for Outputting Information," which is hereby incorporated by reference in its entirety.

TECHNICAL FIELD

The present disclosure relates to the field of computer technology, specifically to the field of Internet technology, and more specifically to a method and apparatus for outputting information.

BACKGROUND

The existing general hot info-news discovery in various fields does not have a sophisticated solution, and is achieved by simply crawling and listing based on sub-channels of various websites.

According to the traditional method, the hot info-news is generally acquired based on data of users such as an amount of reading info-news, an amount of viewing the info-news, and a number of comments on the info-news. A large amount of data needs to be collected manually to predict and report hotspots of info-news in the whole network or info-news in some regions. In addition, the hot info-news is determined manually and subjectively.

SUMMARY

Embodiments of the present disclosure provide a method and apparatus for outputting information.

In a first aspect, the embodiments of the present disclosure provide a method for outputting information. The method includes: acquiring an info-news data set from a target info-news website; determining a field to which each piece of info-news data in the info-news data set belongs; performing, for each field, a cluster analysis on the piece of info-news data belonging to the field in the info-news data set, to obtain a number of the piece of info-news data and a cluster center in each cluster; and using, for each cluster of each field, the cluster center in the cluster as hot info-news of the field, and using the number of the piece of info-news data belonging to the cluster as an info-news heat degree of the info-news information, and outputting the info-news heat degree.

In some embodiments, each piece of info-news data in the info-news data set includes an info-news title and info-news content. After the acquiring an info-news data set from a target info-news data website, the method further includes: determining a similarity between the info-news title and the info-news content of each piece of info-news data in the info-news data set; and removing a piece of info-news data having the similarity smaller than a predefined similarity threshold from the info-news data set.

In some embodiments, after the acquiring an information set from a target info-news website, the method further includes: comparing, for each piece of information in the information set, the piece of information with a filter word in a preset filter word set, and removing the piece of information from the info-news data set if the piece of information matches the filter word.

In some embodiments, the determining a field to which each piece of info-news data in the info-news data set belongs includes: inputting the info-news data set into a preset topic model to obtain at least one information topic, where the topic model is used to represent a corresponding relationship between the piece of info-news data and the information topic; and searching, for each information topic in the at least one information topic, for a field corresponding to the information topic from a predetermined field mapping table, and using the field as the field to which the piece of info-news data corresponding to the information topic belongs, where the field mapping table is used to represent a corresponding relationship between the information topic and the field.

In some embodiments, the determining a field to which each piece of info-news data in the info-news data set belongs includes: inputting the info-news data set into a preset attention model to obtain at least one focus point, where the attention model is used to represent a corresponding relationship between the piece of info-news data and the focus point; and inputting, for each focus point in the at least one focus point, the focus point into a preset field classification model to obtain a field to which the focus point belongs, and using the field as the field to which the piece of info-news data corresponding to the focus point belongs, where the field classification model is used to represent a corresponding relationship between the field and the focus point.

In some embodiments, the method further includes: acquiring a click log, where the click log includes at least one piece of search information and at least one piece of clicked information searched based on the at least one piece of search information; and for each cluster of each field: determining a similarity between the cluster center belonging to the cluster and each of the at least one piece of clicked information in the click log, and determining the piece of clicked information having the similarity greater than a predefined similarity threshold; determining a total number of an occurrence of each piece of search information in the click log; and determining a sum of the total number of the occurrence and the number of the piece of info-news data belonging to the cluster as the info-news heat degree of the hot info-news corresponding to the cluster of the field.

In some embodiments, the method further includes: converting the hot info-news of each field into a predetermined format, and storing the converted hot info-news and the corresponding info-news heat degree into a database.

In a second aspect, the embodiments of the present disclosure provide an apparatus for outputting information. The apparatus includes: an acquiring unit, configured to acquire an info-news data set from a target info-news website; a field determining unit, configured to determine a field to which each piece of info-news data in the info-news data set belongs; a clustering unit, configured to perform, for each field, a cluster analysis on the piece of info-news data belonging to the field in the info-news data set, to obtain a number of the piece of info-news data and a cluster center in each cluster; and an outputting unit, configured to use, for each cluster of each field, the cluster center in the cluster as hot info-news of the field, and use the number of the piece of info-news data belonging to the cluster as an info-news heat degree of the hot info-news and output the info-news heat degree.

In some embodiments, each piece of info-news data in the info-news data set includes an information title and information content. The apparatus further includes a filtering unit. The filtering unit is configured to: after the info-news data set is acquired from the target info-news website, determine a similarity between the information title and the information content of each piece of info-news data in the info-news data set; and remove a piece of info-news data having the similarity smaller than a predefined similarity threshold from the info-news data set.

In some embodiments, the apparatus further includes the filtering unit. The filtering unit is configured to: after the info-news data set is acquired from the target info-news website, compare, for each piece of info-news data in the info-news data set, the piece of info-news data with a filter word in a preset filter word set, and remove the piece of info-news data from the info-news data set if the piece of info-news data matches the filter word.

In some embodiments, the field determining unit is further configured to: input the info-news data set into a preset topic model to obtain at least one information topic, where the topic model is used to represent a corresponding relationship between the piece of info-news data and the information topic; and search, for each information topic in the at least one information topic, for a field corresponding to the information topic from a predetermined field mapping table, and use the field as the field to which the piece of info-news data corresponding to the information topic belongs, where the field mapping table is used to represent a corresponding relationship between the information topic and the field.

In some embodiments, the field determining unit is further configured to: input the info-news data set into a preset attention model to obtain at least one focus point, where the attention model is used to represent a corresponding relationship between the piece of info-news data and the focus point; and input, for each focus point in the at least one focus point, the focus point into a preset field classification model to obtain a field to which the focus point belongs, and use the field as the field to which the piece of info-news data corresponding to the focus point belongs, where the field classification model is used to represent a corresponding relationship between the field and the focus point.

In some embodiments, the apparatus further includes a heat degree determining unit. The heat degree determining unit is configured to: acquire a click log, where the click log includes at least one piece of search information and at least one piece of clicked information searched base on each of the at least one piece of search information; and for each cluster of each field, determine a similarity between the cluster center belonging to the cluster and each of the at least one piece of clicked information in the click log, and determine the piece of clicked information having a similarity between the clicked information and the cluster center greater than a predefined similarity threshold; determine a total number of an occurrence of each piece of search information in the click log; and determine a sum of the number of the occurrence and the number of the piece of info-news data belonging to the cluster as the info-news heat degree of the hot info-news corresponding to the cluster of the field.

In some embodiments, the apparatus further includes a storing unit. The storing unit is configured to: convert the hot info-news of each field into a predetermined format, and store the converted hot info-news and the corresponding info-news heat degree into a database.

In a third aspect, the embodiments of the present disclosure provide a server. The server includes: one or more processors; and a storage device, configured to store one or more programs. The one or more programs, when executed by the one or more processors, cause the one or more processors to implement the method according to any embodiment in the first aspect.

In a fourth aspect, the embodiments of the present disclosure provide a computer readable storage medium storing a computer program. The program, when executed by a processor, implements the method according to any embodiment in the first aspect.

According to the method and apparatus for outputting information according to the embodiments of the present disclosure, the acquired information is divided into a plurality of fields. The clustering is performed on the information of each field to obtain the cluster center and the cluster center is used as the hot info-news. The number of the piece of info-news data in each cluster is used as the info-news heat degree of the hot info-news, and the info-news heat degree is output. Accordingly, an accuracy of identifying the field and a speed of identifying the hot info-news can be improved.

BRIEF DESCRIPTION OF THE DRAWINGS

After reading detailed descriptions of non-limiting embodiments given with reference to the following accompanying drawings, other features, objectives, and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
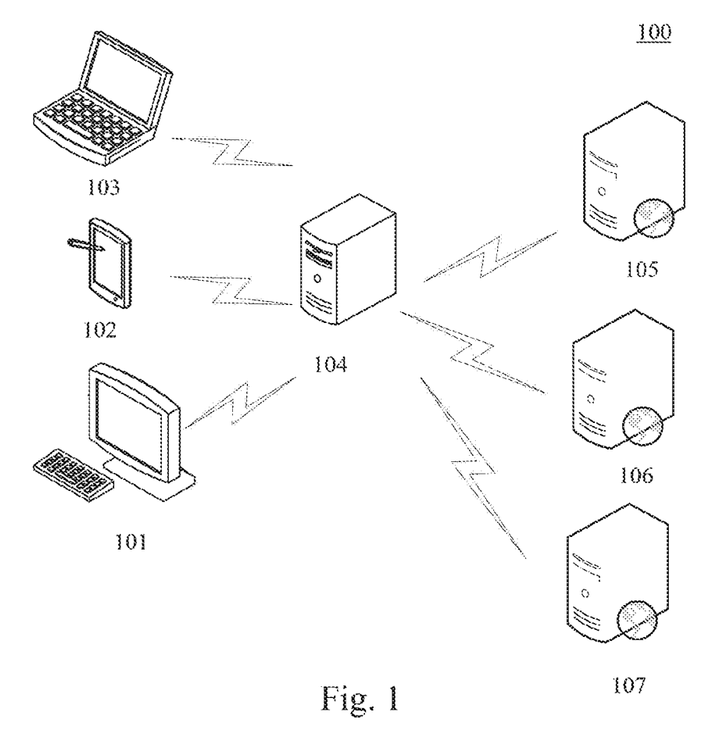
FIG. 1 illustrates a system architecture in which some embodiments of the present disclosure may be applied.

FIG. 1 shows a system architecture 100 in which a method for outputting information or an apparatus for outputting information according to the embodiments of the present disclosure can be implemented.

As shown in FIG. 1, the system architecture 100 may include terminal devices 101, 102 and 103, a server 104 and websites 105, 106 and 107. The communication link between the terminal devices 101, 102 and 103, the server 104, and the websites 105, 106 and 107 may include various types of connections, such as wired or wireless transmission links, or optical fibers.

The user may use the terminal devices 101, 102 and 103 to interact with the server 104 and the websites 105, 106 and 107, in order to transmit or receive messages, etc. Various communication client applications, such as webpages browsing applications, shopping applications, search applications, instant messaging tools, mailbox clients, and social platform software may be installed on the terminal devices 101, 102 and 103.

The terminal devices 101, 102 and 103 may be various electronic devices having display screens and supporting webpage browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

Websites 105, 106 and 107 may be servers capable of providing information.

The server 104 may be a server providing various services, for example, a backend information analyzing server providing support to hot info-news displayed on the terminal devices 101, 102 and 103. The backend information analyzing server may perform a processing such as an analysis on data such as received information, and return a processing result (for example, hot info-news in each field) to the terminal devices.

It should be noted that the method for outputting information according to the embodiments of the present disclosure is generally executed by the server 104. Accordingly, the apparatus for outputting information is generally installed on the server 104.

It should be appreciated that the numbers of the terminal devices, the networks and the servers in FIG. 1 are merely illustrative. Any number of terminal devices, networks and servers may be provided based on the actual requirements.

Figure 2:
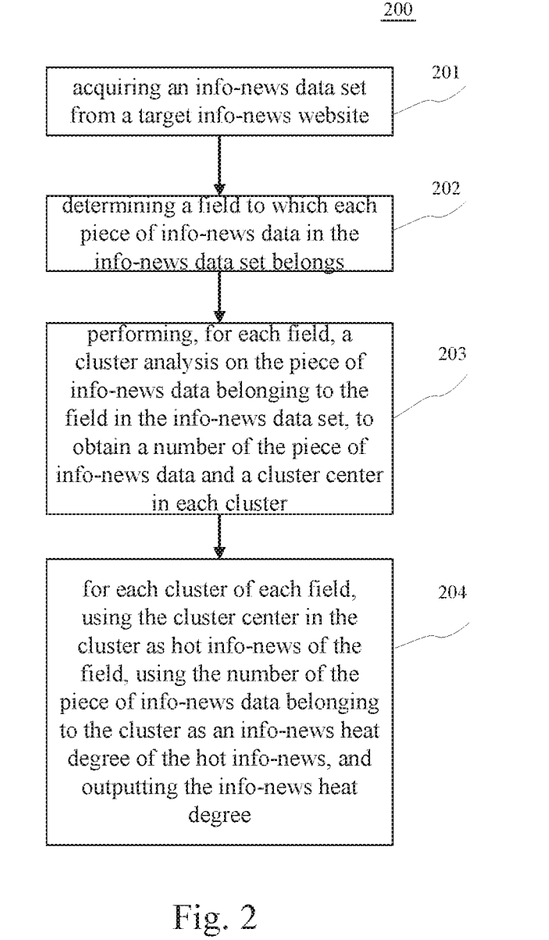
FIG. 2 is a flowchart of an embodiment of a method for outputting information according to the present disclosure.

Reference is made to FIG. 2, which illustrates a flow 200 of an embodiment of a method for outputting information according to the present disclosure. The method for outputting information includes steps 201 to 204.

Step 201 includes acquiring an info-news data set from a target info-news website.

In this embodiment, an electronic device (e.g., the server as illustrated in FIG. 1) on which the method for outputting information is performed may acquire the info-news data set from the target info-news website by means of a wired connection or a wireless connection. The target info-news website may be a mainstream news site on the market. A user may pre-set target info-news websites from which information is acquired, and a number of target info-news websites may be more than one. The info-news is information that can bring value to the user in a relatively short period since the user acquire the info-news in time. The info-news has timeliness and regionality. The info-news may include other media in addition to news.

In some alternative implementations of this embodiment, each piece of info-news data in the info-news data set includes an information title and information content. After the acquiring an info-news data set from a target info-news website, the method further includes: determining a similarity between the information title and the information content of each piece of info-news data in the info-news data set; and removing a piece of info-news data having a similarity between an information title and information content smaller than a predefined similarity threshold from the info-news data set. Since there may be a problem in the process of analyzing the acquired information, it is necessary to perform a correlation calculation on the title and the content, thereby filtering out the dirty data generated due to a failed analysis or an incorrect analyzing position.

In some alternative implementations of this embodiment, after the acquiring an info-news data set from a target info-news website, the method further includes: comparing, for each piece of info-news data in the info-news data set, the piece of info-news data with a filter word in a preset filter word set, and removing the piece of info-news data from the info-news data set if the piece of info-news data matches the filter word. Since there is a mixture of information streams of a plurality of sites, the quality of the content is uneven. Data of low-quality content such as advertisement, pornographic content, and anti-spam may be compared with the filter word in the preset filter word set, to filter the matching information.

Step 202 includes determining a field to which each piece of info-news data in the info-news data set belongs.

In this embodiment, different fields are pre-divided. Then a divided filed corresponding to each piece of info-news data is determined. The field to which each piece of info-news data belongs may be determined by comparing a keyword in each piece of info-news data with a predetermined field word set. The field to which each piece of info-news data belongs may alternatively be determined by a general model. For example, the pre-divided fields are fields of science and technology, entertainment, and sports. The field of the news information that XX wins the Olympic gold medal may be determined as the field of sports. The field of the news information that YY movie is released is determined as the field of entertainment.

In some alternative implementations of this embodiment, the determining a field to which each piece of info-news data in the info-news data set belongs includes: inputting the info-news data set into a preset topic model to obtain at least one information topic, where the topic model is used to represent a corresponding relationship between the piece of info-news data and the information topic; and searching, for each information topic in the at least one information topic, for a field corresponding to the information topic from a predetermined field mapping table, and using the field as the field to which the piece of info-news data corresponding to the information topic belongs, where the field mapping table is used to represent a corresponding relationship between the information topic and the field. The topic model is a statistical model used to discover an abstract topic in a series of documents. Intuitively, if an article has one central idea, some specific words may occur more frequently. For example, if an article is related to a dog, words such as "dog" and "bone" may occur more frequently. If an article is related to a cat, words such as "cat" and "fish" may occur more frequently. Moreover, frequencies of occurrence of words such as "this" and "and" in the two articles may be roughly equal. However, actually, one article generally contains a plurality of topics, and each topic occupies a different proportion. Therefore, if 10% of an article is related to the cat and 90% is related to the dog, a number of occurrences of keywords associated with the dog may probably be nine times as many as that of keywords associated with the cat. The topic model attempts to embody this characteristic of the document using a mathematical framework. The topic model automatically analyzes every document, counts words in the document, and determines, based on the statistical information, what topics are included in the document and the proportion of each topic. At least one information topic may be obtained using a common topic model such as a LDA (Latent Dirichlet Allocation) topic model or PLSA (Probabilistic latent semantic analysis) topic model. Then, according to the field mapping table, the field corresponding to the information topic is searched for. After the fields are divided, the field mapping table is often different from the classification system required by a user. For example, for politics and current politics, a mapping table is needed to be established in advance, to perform mapping on different fields or similar fields, so as to generate information in different fields.

In some alternative implementations of this embodiment, the determining a field to which each piece of info-news data in the info-news data set belongs includes: inputting the info-news data set into a preset attention model to obtain at least one focus point, where the attention model is used to represent a corresponding relationship between the piece of info-news data and the focus point; and inputting, for each focus point in the at least one focus point, the focus point into a preset field classification model to obtain a field to which the focus point belongs, and using the field as the field to which the piece of info-news data corresponding to the focus point belongs, where the field classification model is used to represent a corresponding relationship between the field and the focus point. The attention model is a general-purpose model. When generating an output, the attention model may also generates an "attention range," representing that which parts of an input sequence should be paid close attention to during the next output, and then generates the next output based on the attention area, and so on. The field classification model is a model obtained through learning and training by using information in a plurality of fields as sample data. The sample data include a field tag. The focus point may be used as an input of the field classification model obtained by training, so that the field to which the focus point belongs may be outputted.

Step 203 includes performing, for each field, a cluster analysis on the piece of info-news data belonging to the field in the info-news data set, to obtain a number of the piece of info-news data and a cluster center in each cluster.

In this embodiment, after the field to which the piece of info-news data belongs is determined, the cluster analysis needs to be performed on the piece of info-news data in different fields to merge similar information, and the number of the piece of info-news data in the cluster is calculated to be used as a frequency of occurrence of the cluster center. In addition, the same cluster center may be reported in different sites, the statistical frequencies of the news need to be accumulated when de-duplication is performed. The clustering may be performed using a DBSCAN (Density-Based Spatial Clustering of Applications with Noise) method, and a similarity may be calculated using a Jaccard similarity coefficient. DBSCAN is a density-based spatial clustering algorithm. The algorithm determines an area having sufficient density as a cluster and finds arbitrarily shaped clusters in a spatial database with noise and defines the cluster as a maximal set of density-connected points. The algorithm utilizes the concept of density-based clustering, which requires that a number of objects (points or other spatial objects) contained in a certain area in a cluster space is not smaller than a given threshold. The significant advantages of the DBSCAN algorithm lie in the fast clustering speed, and the capability to effectively process a noise point and find an arbitrarily shaped spatial cluster.

Step 204 includes for each cluster of each field, using the cluster center in the cluster as hot info-news of the field, using the number of the piece of info-news data belonging to the cluster as an info-news heat degree of the hot info-news, and outputting the info-news heat degree.

In this embodiment, for each field, the cluster center in the clustering result of step 203 is used as the hot info-news of the field, and the number of the piece of info-news data belonging to the cluster is used as the info-news heat degree of the hot info-news and outputted. There may be a plurality of clusters in one field, that is, there may be a plurality of pieces of hot info-news in one field, and the plurality of pieces of hot info-news may be outputted in a descending order of info-news heat degrees.

In some alternative implementations of this embodiment, the hot info-news of each field may alternatively be converted into a predetermined format, and the converted hot info-news and the corresponding info-news heat degree are stored into a database together. For example, the format of the hot info-news may be title+URL (uniform resource locator)+time. URL is the source of the information, and the time is the reporting time extracted from the information.

Figure 3:
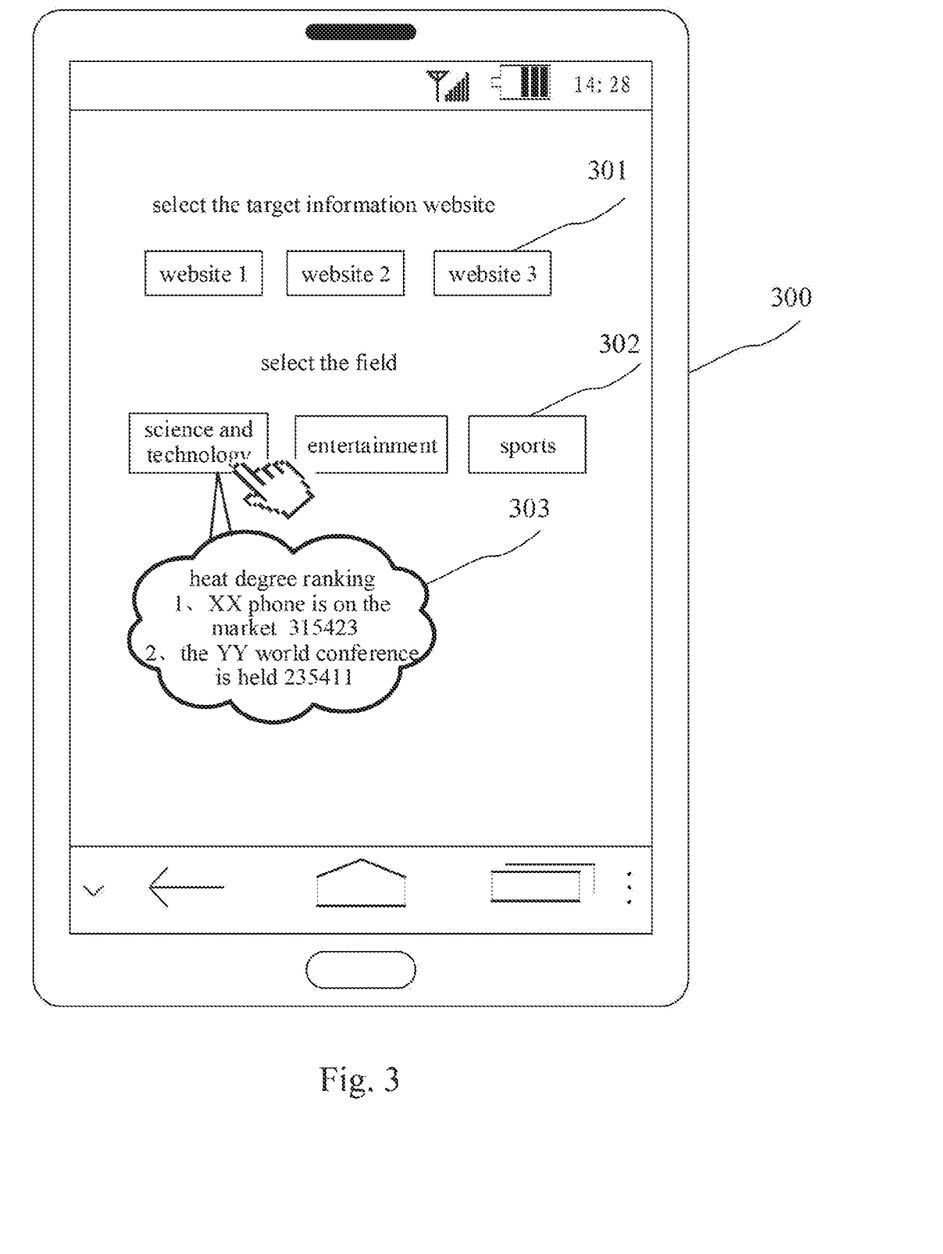
FIG. 3 is a schematic diagram of an application scenario of the method for outputting information according to some embodiments of the present disclosure.

Further reference is made to FIG. 3, which is a schematic diagram of an application scenario of the method for outputting information according to some embodiments of the present disclosure. In the application scenario of FIG. 3, the user may select the target info-news website 301 through the terminal 300. The server acquires the information from the target info-news website 301 selected by the user, associates the acquired information with the predetermined field, and then determines the hot info-news of each field and the info-news heat degree. When the user clicks one of the field options 302, the hot info-news 303 is outputted.

In the method provided by the above embodiment of the present disclosure, the info-news is associated with the fields, and the hot info-news of each field is obtained by performing the cluster analysis, thereby improving the accuracy of identifying the field and improving the speed of identifying the hot info-news.

Figure 4:
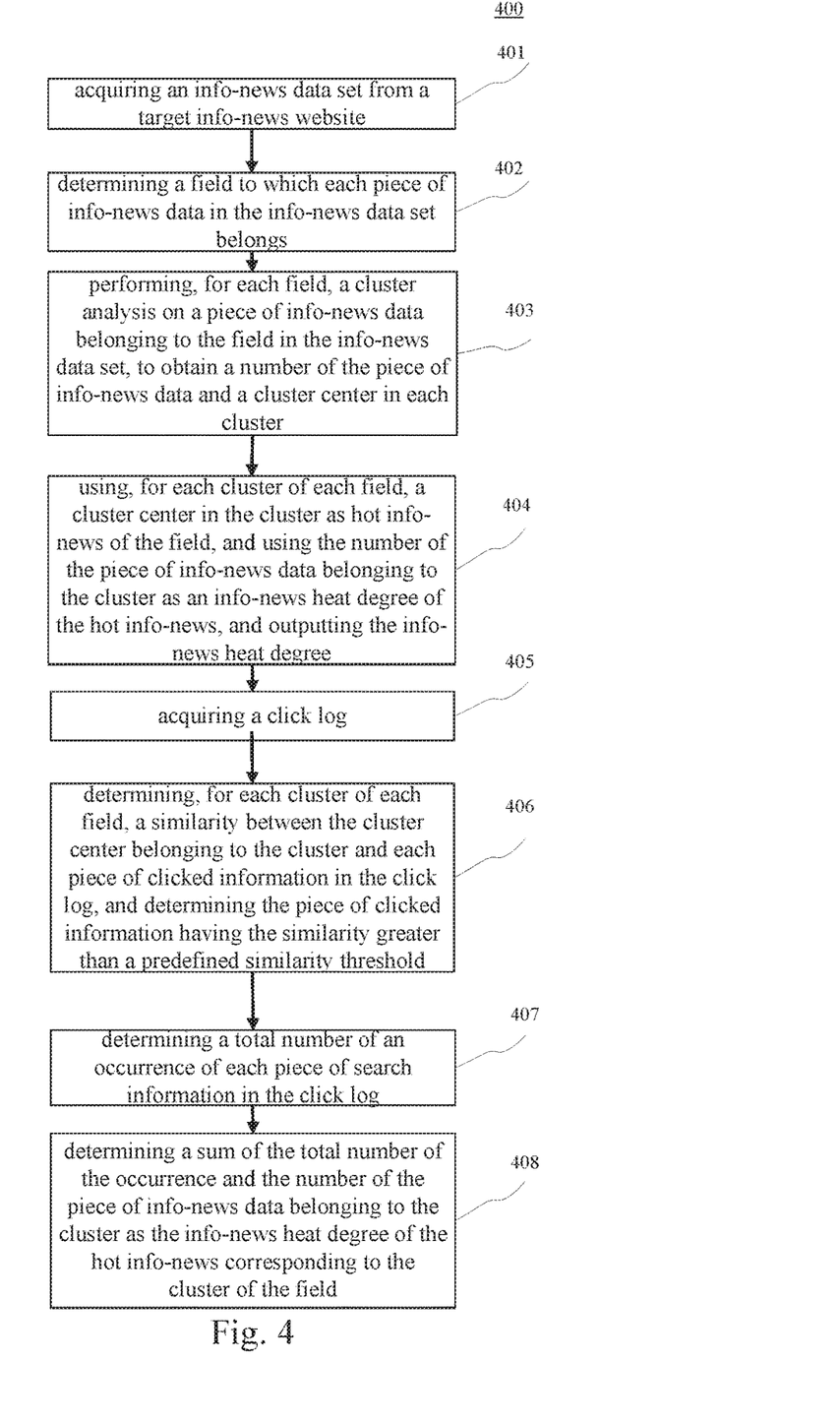
FIG. 4 is a flowchart of another embodiment of the method for outputting information according to the present disclosure.

Further referring to FIG. 4, which illustrates a flow 400 of another embodiment of the method for outputting information. The flow 400 of the method for outputting information includes steps 401 to 408.

Step 401 includes acquiring an info-news data set from a target info-news website.

Step 402 includes determining a field to which each piece of info-news data in the info-news data set belongs.

Step 403 includes performing, for each field, a cluster analysis on a piece of info-news data belonging to the field in the info-news data set, to obtain a number of the piece of info-news data and a cluster center in each cluster.

Step 404 includes using, for each cluster of each field, a cluster center in the cluster as hot info-news of the field, and using the number of the piece of info-news data belonging to the cluster as an info-news heat degree of the hot info-news, and outputting the info-news heat degree.

Steps 401-404 are substantially the same as steps 201-204, and thus, steps 401-404 will not be repeatedly described.

Step 405 includes acquiring a click log.

In this embodiment, the click log includes at least one piece of search information and at least one piece of clicked information searched based on the at least one piece of search information. The info-news heat degree obtained in step 204 is determined by a number of reports in each website. In order to reflect attention of the public to the information, reference may be made to click logs of netizens in various regions. The click log records behavior information of the user, including information such as a search keyword, and contents clicked and viewed.

Step 406 includes determining, for each cluster of each field, a similarity between the cluster center belonging to the cluster and each piece of clicked information in the click log, and determining the piece of clicked information having the similarity greater than a predefined similarity threshold.

In this embodiment, the similarity may use a Jaccard similarity coefficient, a cosine coefficient, or the like. If the similarity between the clicked piece of info-news data and the cluster center is greater than the predefined similarity threshold, the piece of clicked information is similar to the cluster center.

Step 407 includes determining a total number of an occurrence of each piece of search information in the click log.

In this embodiment, the same piece of search information in the click log may occur a plurality of times, and the accumulated number of occurrences of the same piece of search information is determined.

Step 408 includes determining a sum of the total number of the occurrence and the number of the piece of info-news data belonging to the cluster as the info-news heat degree of the hot info-news corresponding to the cluster of the field.

In this embodiment, the info-news heat degree determined in step 204 is corrected using the number of the occurrence of the piece of search information. For a piece of info-news data reported for few times and clicked and viewed by many users, the piece of info-news data may also be hot. Therefore, the statistics is performed on the number in real time in combination with the piece of info-news data searched and clicked by the user, so that the heat degree of the piece of info-news data may be efficiently reflected.

As may be seen from FIG. 4, in contrast to the embodiment corresponding to FIG. 2, the flow 400 of the method for outputting information in this embodiment emphasizes the step of correcting the info-news heat degree according to the data searched and clicked by the user. Therefore, the solution described in this embodiment may introduce more data related to the info-news heat degree, thereby achieving the more effective statistics on the info-news heat degree.

Figure 5:
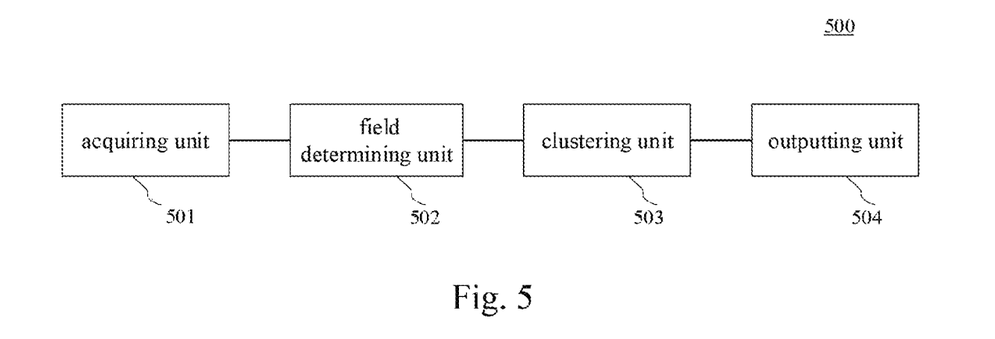
FIG. 5 is a schematic structural diagram of an embodiment of an apparatus for outputting information according to the present disclosure.

Further referring to FIG. 5, as an implementation of the method shown in the above figures, the present disclosure provides an embodiment of an apparatus for outputting information. The embodiment of the apparatus corresponds to the embodiment of the method illustrated in FIG. 2, and the apparatus may be applied in various electronic devices.

As shown in FIG. 5, the apparatus for outputting information 500 according to this embodiment includes: an acquiring unit 501, a field determining unit 502, a clustering unit 503, and an outputting unit 504. The acquiring unit 501 is configured to acquire an info-news data set from a target info-news website. The field determining unit 502 is configured to determine a field to which each piece of info-news data in the info-news data set belongs. The clustering unit 503 is configured to perform, for each field, a cluster analysis on the piece of info-news data belonging to the field in the info-news data set, to obtain a number of the piece of info-news data and a cluster center in each cluster. The outputting unit 504 is configured to use, for each cluster of each field, the cluster center in the cluster as hot info-news of the field, and use the number of the piece of info-news data belonging to the cluster as an info-news heat degree of the hot info-news and output the info-news heat degree.

In this embodiment, for specific processes of the acquiring unit 501, the field determining unit 502, the clustering unit 503, and the outputting unit 504 in the apparatus for outputting information 500, reference may be made to relative descriptions of step 201, step 202, step 203, and step 204 in the corresponding embodiment of FIG. 2 respectively.

In some alternative implementations of this embodiment, each piece of info-news data in the info-news data set includes an information title and information content. The apparatus 500 further includes a filtering unit (not shown). The filtering unit is configured to: determine a similarity between the information title and the information content of each piece of info-news data in the info-news data set, after the info-news data set is acquired from the target info-news website; and remove a piece of info-news data having the similarity smaller than a predefined similarity threshold from the info-news data set.

In some alternative implementations of this embodiment, the filtering unit is further configured to: compare, for each piece of info-news data in the info-news data set, the piece of info-news data with a filter word in a preset filter word set after the info-news data set is acquired from the target info-news website, and remove the piece of info-news data from the info-news data set if the piece of info-news data matches the filter word.

In some alternative implementations of this embodiment, the field determining unit 502 is further configured to: input the info-news data set into a preset topic model to obtain at least one information topic, where the topic model is used to represent a corresponding relationship between the piece of info-news data and the information topic; and search, for each information topic in the at least one information topic, for a field corresponding to the information topic from a predetermined field mapping table, and use the field as the field to which the piece of info-news data corresponding to the information topic belongs, where the field mapping table is used to represent a corresponding relationship between the information topic and the field.

In some alternative implementations of this embodiment, the field determining unit 502 is further configured to: input the info-news data set into a preset attention model to obtain at least one focus point, where the attention model is used to represent a corresponding relationship between the piece of info-news data and the focus point; and input, for each focus point in the at least one focus point, the focus point into a preset field classification model to obtain a field to which the focus point belongs, and use the field as the field to which the piece of info-news data corresponding to the focus point belongs, where the field classification model is used to represent a corresponding relationship between the field and the focus point.

In some alternative implementations of this embodiment, the apparatus 500 further includes a heat degree determining unit (not shown). The heat degree determining unit is configured to: acquire a click log, where the click log includes at least one piece of search information and at least one piece of clicked information searched based on the at least one piece of search information; and for each cluster of each field: determining a similarity between the cluster center belonging to the cluster and each piece of clicked information in the click log, and determining a piece of clicked information having the similarity greater than a predefined similarity threshold; determining a total number of an occurrence of each piece of search information in the click log; and determining a sum of the number of the occurrence and the number of the piece of info-news data belonging to the cluster as the info-news heat degree of the hot info-news corresponding to the cluster of the field.

In some alternative implementations of this embodiment, the apparatus 500 further includes a storing unit (not shown).

The storing unit is configured to: convert the hot info-news of each field into a predetermined format, and store the converted hot info-news and the corresponding info-news heat degree into a database.

Figure 6:
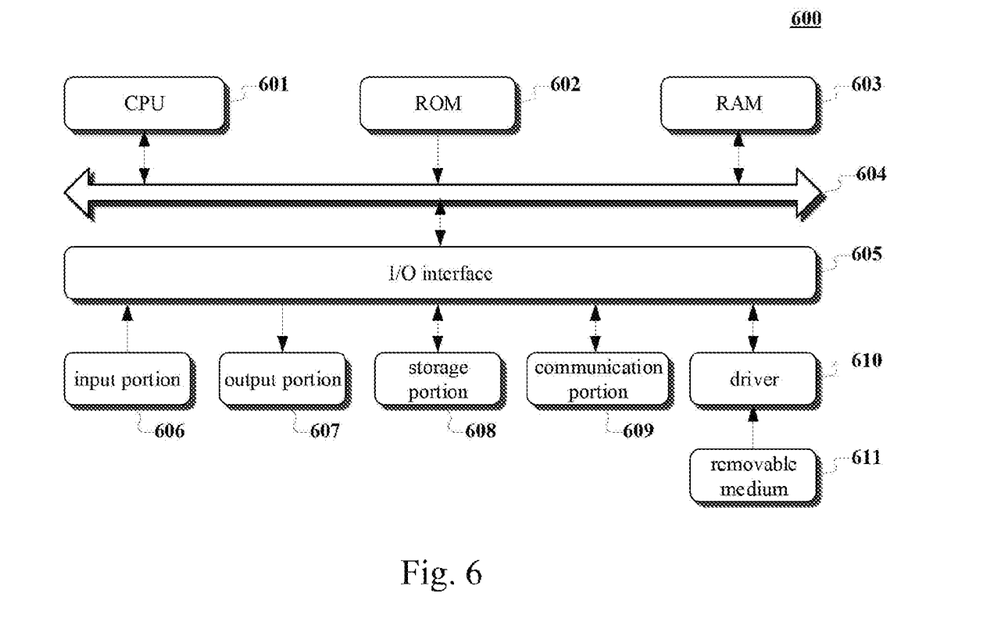
FIG. 6 is a schematic structural diagram of a computer system adapted to implement a server according to the embodiments of the present disclosure.

Referring to FIG. 6, a schematic structural diagram of a computer system 600 adapted to implement a server of the embodiments of the present disclosure is shown. The server shown in FIG. 6 is only an example, and should not limit a function and scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above. A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider). The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring unit, a field determining unit, a clustering unit, and an outputting unit, where the names of these units do not in some cases constitute a limitation to such units themselves. For example, the acquiring unit may also be described as "a unit for acquiring an info-news data set from a target info-news website."

In another aspect, some embodiments of the present disclosure further provide a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: acquire an info-news data set from a target info-news website; determine a field to which each piece of info-news data in the info-news data set belongs; perform, for each field, a cluster analysis on the piece of info-news data belonging to the field in the info-news data set, to obtain a number of the piece of info-news data and a cluster center in each cluster; and use, for the each cluster of the each field, the cluster center in the cluster as hot info-news of the field, and use the number of the piece of info-news data belonging to the cluster as an info-news heat degree of the hot info-news and outputting the info-news heat degree.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting information, comprising:
acquiring an info-news data set from a target info-news website;
determining a field to which each piece of info-news data in the info-news data set belongs;
performing, for each of the field, a cluster analysis on the piece of info-news data belonging to the each field in the info-news data set, to obtain a number of the piece of info-news data and a cluster center in each cluster;
using, for each cluster of each field, the cluster center in the each cluster as hot info-news of the each field, and using the number of the piece of info-news data belonging to the each cluster as an info-news heat degree of the hot info-news, and outputting the info-news heat degree;
acquiring a click log, wherein the click log includes at least one piece of search information and at least one piece of clicked information searched based on the at least one piece of search information; and
for each cluster of each field:
determining a similarity between the cluster center belonging to the each cluster and each of the at least one piece of clicked information in the click log, and determining the piece of clicked information including the similarity greater than a predefined similarity threshold,
determining a total number of an occurrence of each piece of search information in the click log, and
determining a sum of the total number of the occurrence and the number of the piece of info-news data belonging to the cluster as the info-news heat degree of the hot info-news corresponding to the cluster of the field, wherein outputting the info-news heat degree comprises:
presenting a plurality of options of websites and a plurality of options of to-be-selected fields in an interface, the websites including the target info-news website;
associating the plurality of options of the to-be-selected fields with the target info-news website by selecting the target info-news website on the interface; and
acquiring a click to a first option of a first to-be-selected field in the plurality of options of the to-be-selected fields, and in response to the click, outputting the hot info-news and the info-news heat degree of the hot info-news in the first to-be-selected field,
wherein the method is performed by at least one processor.

2. The method according to claim 1, wherein each piece of info-news data in the info-news data set includes an information title and information content, and
after the acquiring an info-news data set from a target info-news website, the method further comprises:
determining a similarity between the information title and the information content of each piece of info-news data in the info-news data set; and
removing a piece of info-news data including the similarity smaller than a predefined similarity threshold from the info-news data set.

3. The method according to claim 1, wherein after the acquiring an info-news data set from a target info-news website, the method further comprises:
comparing, for each piece of info-news data in the info-news data set, the piece of info-news data with a filter word in a preset filter word set, and removing the piece of info-news data from the info-news data set in response to determining that the piece of info-news data matches the filter word.

4. The method according to claim 1, wherein the determining a field to which each piece of info-news data in the info-news data set belongs comprises:
inputting the info-news data set into a preset topic model to obtain at least one information topic, wherein the preset topic model is used to represent a corresponding relationship between the piece of info-news data and the information topic; and
searching, for each information topic in the at least one information topic, for a field corresponding to the information topic from a predetermined field mapping table, and using the field as the field to which the piece of info-news data corresponding to the information topic belongs, wherein the field mapping table is used to represent a corresponding relationship between the information topic and the field.

5. The method according to claim 1, wherein the determining a field to which each piece of info-news data in the info-news data set belongs comprises:
inputting the info-news data set into a preset attention model to obtain at least one focus point, wherein the preset attention model is used to represent a corresponding relationship between the piece of info-news data and the focus point; and
inputting, for each focus point in the at least one focus point, the each focus point into a preset field classification model to obtain a field to which the focus point belongs, and using the field as the field to which the piece of info-news data corresponding to the focus point belongs, wherein the preset field classification model is used to represent a corresponding relationship between the field and the focus point.

6. The method according to claim 1, further comprising:
converting the hot info-news of each field into a predetermined format, and storing the converted hot info-news and the corresponding info-news heat degree into a database.

7. An apparatus for outputting information, comprising:
at least one processor; and
a memory storing instructions, wherein the instructions when executed by the at least one processor, cause the at least one processor to perform operations, the operations comprising:
acquiring an info-news data set from a target info-news website;
determining a field to which each piece of info-news data in the info-news data set belongs;
performing, for each of the field, a cluster analysis on the piece of info-news data belonging to the field in the info-news data set, to obtain a number of the piece of info-news data and a cluster center in each cluster;
using, for each cluster of each field, the cluster center in the cluster as hot info-news of the field, and using the number of the piece of info-news data belonging to the each cluster as an info-news heat degree of the hot info-news and outputting the info-news heat degree;
acquiring a click log, wherein the click log includes at least one piece of search information and at least one piece of clicked information searched based on the at least one piece of search information; and
for each cluster of each field:
determining a similarity between the cluster center belonging to the each cluster and each of the at least one piece of clicked information in the click log, and determining the piece of clicked information including the similarity greater than a predefined similarity threshold,
determining a total number of an occurrence of each piece of search information in the click log, and
determining a sum of the total number of the occurrence and the number of the piece of info-news data belonging to the cluster as the info-news heat degree of the hot info-news corresponding to the cluster of the field,
wherein the outputting the info-news heat degree comprises:
presenting a plurality of options of websites and a plurality of options of to-be-selected fields in an interface, the websites including the target info-news website;
associating the plurality of options of the to-be-selected fields with the target info-news website by selecting the target info-news website on the interface; and
acquiring a click to a first option of a first to-be-selected field in the plurality of options of the to-be-selected fields, and in response to the click, outputting the hot info-news and the info-news heat degree of the hot info-news in the first to-be-selected field.

8. The apparatus according to claim 7, wherein each piece of info-news data in the info-news data set includes an information title and information content, and
after the acquiring an info-news data set from a target info-news website, the operations further comprise:
determining a similarity between the information title and the information content of each piece of info-news data in the info-news data set, after the info-news data set is acquired from the target info-news website; and
removing a piece of info-news data including the similarity smaller than a predefined similarity threshold from the info-news data set.

9. The apparatus according to claim 7, wherein after the acquiring an info-news data set from a target info-news website, the operations further comprise:
comparing, for each piece of info-news data in the info-news data set, the piece of info-news data with a filter word in a preset filter word set after the info-news data set is acquired from the target info-news website, and remove the piece of info-news data from the info-news data set in response to determining that the piece of info-news data matches the filter word.

10. The apparatus according to claim 7, wherein the determining a field to which each piece of info-news data in the info-news data set belongs comprises:
inputting the info-news data set into a preset topic model to obtain at least one information topic, wherein the preset topic model is used to represent a corresponding relationship between the piece of info-news data and the information topic; and
searching, for each information topic in the at least one information topic, for a field corresponding to the information topic from a predetermined field mapping table, and using the field as the field to which the piece of info-news data corresponding to the information topic belongs, wherein the field mapping table is used to represent a corresponding relationship between the information topic and the field.

11. The apparatus according to claim 7, wherein the determining a field to which each piece of info-news data in the info-news data set belongs comprises:
inputting the info-news data set into a preset attention model to obtain at least one focus point, wherein the preset attention model is used to represent a corresponding relationship between the piece of info-news data and the focus point; and
inputting, for each focus point in the at least one focus point, the each focus point into a preset field classification model to obtain a field to which the focus point belongs, and using the field as the field to which the piece of info-news data corresponding to the focus point belongs, wherein the preset field classification model is used to represent a corresponding relationship between the field and the focus point.

12. The apparatus according to claim 7, wherein the operations further comprise:
converting the hot info-news of each field into a predetermined format, and store the converted hot info-news and the corresponding info-news heat degree into a database.

13. A non-transitory computer storage medium, storing a computer program, wherein the program, when executed by a processor, causes the processor to perform operations, the operations comprising:
acquiring an info-news data set from a target info-news website;
determining a field to which each piece of info-news data in the info-news data set belongs;
performing, for each of the field, a cluster analysis on the piece of info-news data belonging to the each field in the info-news data set, to obtain a number of the piece of info-news data and a cluster center in each cluster;
using, for each cluster of each field, the cluster center in the each cluster as hot info-news of the each field, and using the number of the piece of info-news data belonging to the each cluster as an info-news heat degree of the hot info-news, and outputting the info-news heat degree;

acquiring a click log, wherein the click log includes at least one piece of search information and at least one piece of clicked information searched based on the at least one piece of search information; and for each cluster of each field:
- determining a similarity between the cluster center belonging to the each cluster and each of the at least one piece of clicked information in the click log, and determining the piece of clicked information including the similarity greater than a predefined similarity threshold,
- determining a total number of an occurrence of each piece of search information in the click log, and
- determining a sum of the total number of the occurrence and the number of the piece of info-news data belonging to the cluster as the info-news heat degree of the hot info-news corresponding to the cluster of the field, wherein the outputting the info-news heat degree comprises:

presenting a plurality of options of websites and a plurality of options of to-be-selected fields in an interface, the websites including the target info-news website;

associating the plurality of options of the to-be-selected fields with the target info-news website by selecting the target info-news website on the interface; and acquiring a click to a first option of a first to-be-selected field in the plurality of options of the to-be-selected fields, and in response to the click, outputting the hot info-news and the info-news heat degree of the hot info-news in the first to-be-selected field.

* * * * *